(12) United States Patent
Najafabadi

(10) Patent No.: US 12,545,606 B2
(45) Date of Patent: Feb. 10, 2026

(54) PHOTOCATALYTIC COMPOSITE MATERIALS AND METHODS OF USING THE SAME FOR WATER AND/OR SEDIMENT REMEDIATION

(71) Applicant: TryGlobal IP, Holdings LLC, New York, NY (US)

(72) Inventor: Farshid Soheili Najafabadi, Yongin-Si (KR)

(73) Assignee: TRYGLOBAL IP HOLDINGS, INC., New York, NY (US)

( * ) Notice: Subject to any disclaimer, the term of this patent is extended or adjusted under 35 U.S.C. 154(b) by 0 days.

(21) Appl. No.: 19/048,065

(22) Filed: Feb. 7, 2025

(65) Prior Publication Data

US 2025/0178936 A1 Jun. 5, 2025

Related U.S. Application Data

(63) Continuation of application No. PCT/US2024/019924, filed on Mar. 14, 2024.
(Continued)

(51) Int. Cl.
*C02F 1/72* (2023.01)
*B01J 31/06* (2006.01)
(Continued)

(52) U.S. Cl.
CPC .............. *C02F 1/725* (2013.01); *B01J 31/06* (2013.01); *B01J 35/39* (2024.01); *C02F 1/32* (2013.01);
(Continued)

(58) Field of Classification Search
CPC ....... A01N 59/06; A01N 59/16; B01J 21/063; B01J 31/06; B01J 35/20; B01J 35/23; B01J 35/39; B01J 35/392; B01J 35/393; B01J 35/40; B01J 20/0225; B01J 20/0229; B01J 20/0233; B01J 20/24; B01J 20/32; B01J 20/3206; B01J 20/3212; B01J 20/3236; B01J 20/3287; C02F 1/00; C02F 1/28–288; C02F 1/30; C02F 1/32; C02F 1/40; C02F 1/50; C02F 1/68–688; C02F 1/725; C02F 1/74; C02F 2101/105; C02F 2101/15; C02F 2101/322; C02F 2103/007; C02F 2303/04; C02F 2305/08; C02F 2305/10; C08L 5/08; E02B 15/04
See application file for complete search history.

(56) References Cited

FOREIGN PATENT DOCUMENTS

CN 102583634 A 7/2012
CN 103408776 A * 11/2013
(Continued)

OTHER PUBLICATIONS

Chen et al. (2021) "Functionalization of Silver/Titanium Dioxide Composites in Chitosan-based Coatings and their Egg Preservation Performances," J. Vis. Exp. 173:e61850 (11 pages).
(Continued)

*Primary Examiner* — In Suk C Bullock
(74) *Attorney, Agent, or Firm* — CANTOR COLBURN LLP

(57) ABSTRACT

The present teachings describe photocatalytic composite materials that are useful for remediation of bodies of water such as lakes, ponds, wetlands and rice fields, as well as remediation of sediment under the water.

20 Claims, 1 Drawing Sheet

Related U.S. Application Data

(60) Provisional application No. 63/607,212, filed on Dec. 7, 2023, provisional application No. 63/490,596, filed on Mar. 16, 2023.

(51) Int. Cl.
*B01J 35/39* (2024.01)
*C02F 1/32* (2023.01)
*C02F 1/74* (2023.01)
*C02F 101/10* (2006.01)
*C02F 101/16* (2006.01)
*C02F 101/32* (2006.01)
*C02F 103/00* (2006.01)

(52) U.S. Cl.
CPC .......... *C02F 1/74* (2013.01); *C02F 2101/105* (2013.01); *C02F 2101/16* (2013.01); *C02F 2101/322* (2013.01); *C02F 2103/007* (2013.01); *C02F 2303/04* (2013.01); *C02F 2305/10* (2013.01)

(56) References Cited

FOREIGN PATENT DOCUMENTS

| | | | |
|---|---|---|---|
| CN | 105557753 A | | 5/2016 |
| CN | 105727901 A | | 7/2016 |
| CN | 105833917 A | | 8/2016 |
| CN | 106561710 A | | 4/2017 |
| JP | 2023023585 A | * | 2/2023 |
| TW | 201509524 A | * | 3/2015 |
| WO | WO2022113759 A1 | * | 6/2022 |

OTHER PUBLICATIONS

International Search Report and Written Opinion for International Application No. PCT/US2024/019924 mailed Jun. 13, 2024 (13 pages).

Kennedy et al. 2023 "Degradation of microcystin algal toxin by 3D printable polymer immobilized photocatalytic $TiO_2$," Chemical Engineering Journal 455: 140866 (11 pages).

Li et al. (2018) "Enhanced Antibacterial Activity of Silver Doped Titanium Dioxide-Chitosan Composites under Visible Light," Materials 11 (17 pages).

* cited by examiner

PHOTOCATALYTIC COMPOSITE MATERIALS AND METHODS OF USING THE SAME FOR WATER AND/OR SEDIMENT REMEDIATION

CROSS REFERENCE TO RELATED APPLICATIONS

This application is a continuation of International Application No. PCT/US2024/019924, with an international filing date of Mar. 14, 2024, which claims the benefit of and priority to U.S. Patent Application No. 63/490,596 filed on Mar. 16, 2023, and U.S. Patent Application No. 63/607,212 filed on Dec. 7, 2023, the entire contents of each of which are incorporated by reference herein.

FIELD

The present teachings are related to water and/or sediment remediation using a photocatalytic composite material that floats or suspends in a body of water needing remediation.

BACKGROUND

With the global expansion of industrial production and leisure facilities, the scope of water quality issues continues to expand. Sewage, agricultural and industrial wastewater, as well as leisure activities, aquaculture and human waste disposal, all contribute to a global pandemic of damaged water bodies (eutrophication), large and small, with no cost-effective, low-carbon profile strategies for their remediation to a natural sustainable state.

Many new and recycled technologies are deployed globally to prevent and counteract the symptoms of Eutrophication—algal blooms, most urgently, blue-green algae ("BGA") and red-tides—with predictably little success. While attempts to reduce pollutants can have an impact, broader environmental trends and history suggest that abstinence is not the answer. Water is 80% of our planet and has always played a central role in human endeavors and ingenuity. Strategies developed to reduce pollutants by absorbing or decomposing harmful materials and heavy metals in the water bodies, including the use of mechanical and bio catalysts, precipitating suspended solids by adding polyelectrolyte coagulants or proliferating alien micro-organisms with enzyme additives are only addressing half the problem—water clarification and temporary algal retardation—while actually contributing to the death spiral on the wrong side of the zero-sum water versus sedimentation equation.

The broad industrial use of water resources coupled with predictably expanding agricultural run-off from chemical fertilizers deployed to counteract dwindling soil productivity, overwhelm the earth's natural carbon cycle, which relies on healthy lakes to break down carbon waste and present it to the sun for photosynthesis. This break down means that a solution is required to clarify the water and remove accumulated sedimentation. Stated directly, blighted waterways with high turbidity are incapable of remediating themselves—simply moving the constant delivery of suspended solids to the bottom, reduces water capacity, causing the dwindling water capacity, to more quickly be overcome by increasing levels of environmental detritus.

At that point, Nature sends its apex predator, BGA, to attack and feast on the suspended nutrition of the blighted lake—soon, only BGA can process the available nutrition that has transformed from broadly consumable carbon to nitrogen and phosphorous locked in sedimentation. Alternative methods, like filters and air injection used in aquaculture, offer some limited abilities to counteract eutrophication in the context of small for-profit operations, but it is not economically or logistically feasible to extrapolate the use of electrical and mechanical forces to remediate bodies of water, more than a few feet deep, or a few acres in area.

The industry desires a system to remediate waters back to their natural state as well as to dissolve and transform sedimentation without mechanical or powered electrical stimulation.

SUMMARY

The present teachings provide a revolutionary technology of products (i.e., photocatalytic composite materials) that expedite phycoremediation and can enhance the natural capacity of bodies of water to reduce chemical oxygen demand, total organic content, and/or excess nutrients (e.g., phosphorus and nitrogen). The present teachings can provide photocatalytic phycoremediation offering a new paradigm to dramatically reduce and control marine sedimentation without the use of non-native microbial additives or sustained mechanical (e.g., dredging) or electrical manipulation. The products of the present teachings can provide fast, scalable solutions that can be optimized for application in lakes, rivers, estuaries, wetlands, rice fields, aquaculture farms, and open ocean waters.

The present teachings can improve water quality in these waters through the targeted delivery and activation of a photocatalyst nanocomposite associated with a biopolymer polyelectrolyte. The base technology is efficacious for various environmental challenges and may also be a used in combination with other methods for large-scale water remediation, as well as enhanced yield and quality in aquaculture.

In one aspect, the present teachings generally provide a photocatalytic composite material including titanium dioxide and silver nanoparticles and a polyelectrolyte that is typically less dense than water so that it can float and remain suspended in water. The photocatalytic composite material can also contain another polymer such as polyvinylpyrrolidone. The photocatalytic composite material can contain selenium and/or copper. The photocatalytic composite material also includes a solvent so that the photocatalytic materials are associated with, for example, coated by or encapsulated by the polyelectrolyte and other polymer as a dispersion or colloidal mixture. The photocatalytic composite material is less dense than water due to the polyelectrolyte such that it floats on and/or remains suspended at or near the surface of the water to maintain maximum visible light and sunlight exposure.

More specifically, a photocatalytic composite material of the present teachings generally includes $TiO_2$ coated Ag ("$(TiO_2)_n$/Ag") nanoparticles in a polyelectrolyte such as chitosan or a chitosan substrate (CS), where the $(TiO_2)_n$/Ag particles are associated with the polyelectrolyte (e.g., chitosan or CS), all in a solvent. (Here, although just meant for symbolism, n can be an integer greater than zero, for example, from about 10 to about 250.) The $(TiO_2)_n$/Ag particles can be further associated with another polymer. The solvent typically includes an acid.

In some embodiments, a photocatalytic composite material of the present teachings generally includes $TiO_2$ coated Ag ("$(TiO_2)_n$/Ag") nanoparticles and selenium (Se), where the $(TiO_2)_n$/Ag particles and Se are associated with a polyelectrolyte such as chitosan, all in a solvent. The $(TiO_2)_n$/Ag particles and Se can be further associated with another polymer. The solvent typically includes an acid.

In some embodiments, a photocatalytic composite material of the present teachings generally includes $TiO_2$ coated Ag ("$(TiO_2)_n$/Ag") nanoparticles and copper (Cu), where the $(TiO_2)_n$/Ag particles and Cu are associated with a polyelectrolyte such as chitosan, all in a solvent. The $(TiO_2)_n$/Ag particles and Cu can be further associated with another polymer. The solvent typically includes an acid.

In some embodiments, a photocatalytic composite material of the present teachings generally includes $TiO_2$ coated Ag ("$(TiO_2)_n$/Ag") nanoparticles, Se and Cu, where the $(TiO_2)_n$/Ag particles, Se and Cu are associated with a polyelectrolyte such as chitosan, all in a solvent. The $(TiO_2)_n$/Ag particles, Se and Cu can be further associated with another polymer. The solvent typically includes an acid.

In various embodiments, the photocatalytic composite material can include $TiO_2$ coated AgCl ("$(TiO_2)_n$/AgCl") particles as a counter-electrode to the $(TiO_2)_n$/Ag particles, which enhances the photocatalytic and electron transfer activities of the material. For example, the photocatalytic composite material can include $(TiO_2)_n$/Ag particles and $(TiO_2)_n$/AgCl particles along with a polyelectrolyte and optionally, another polymer in a solvent. These embodiments can also include Se and an acid.

In some embodiments, the photocatalytic composite material can include $TiO_2$ and Se coated Ag ("$TiO_2$/Ag/Se") particles, $TiO_2$ and/or Se coated AgCl ("$TiO_2$/AgCl/Se") particles. In various embodiments, Cu can be substituted for Se or be in addition to Se in these particles.

In another aspect, the present teachings provide a method of making a photocatalytic composite material, where the method generally includes mixing $TiO_2$, Ag and another polymer in a first solvent to form a first mixture; and exposing the first mixture to a reducing agent until less than about 20% of the Ag is $Ag^+$ to form a reduced mixture; mixing a cationic polyelectrolyte, optionally an acid, and the other polymer in a second solvent to form a second mixture; and adding the second mixture to the reduced mixture hereby forming a photocatalytic composite material.

In some embodiments, the mixing further comprises mixing Se and/or Cu in the first solvent. In various embodiments, the reducing agent comprises ultraviolet radiation, microwaves, or a combination thereof.

In another aspect, the present teachings provide a method of water and/or sediment remediation comprising contacting a photocatalytic composite material as described herein with a body of water in need of remediation, and exposing the photocatalytic composite material to visible light and/or sunlight for a suitable time and under conditions suitable for the photocatalytic composite material to cause contaminant compounds in the body of water to be transformed into one or more different compounds. In certain embodiments, the one or more different compounds are oxidized contaminant compounds. In various embodiments, the body of water is an open body of water. In some embodiments, the body of water is a wetland or a rice field.

In certain embodiments, particularly in wetlands and rice fields, the present teachings provide a method of reducing methane emissions during water remediation comprising contacting a body of water with the photocatalytic composite material as described herein; and exposing the photocatalytic composite material to visible light and/or sunlight for a suitable time and under conditions suitable for the photocatalytic composite material to cause methane in the body of water to be transformed into one or more different compounds.

DESCRIPTION OF DRAWINGS

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

FIG. 1B contains $(TiO_2)_n$/Ag composites and $(TiO_2)_n$/AgCl composites associated with a polymer and chitosan with Se present.

DETAILED DESCRIPTION

Figure 1A:
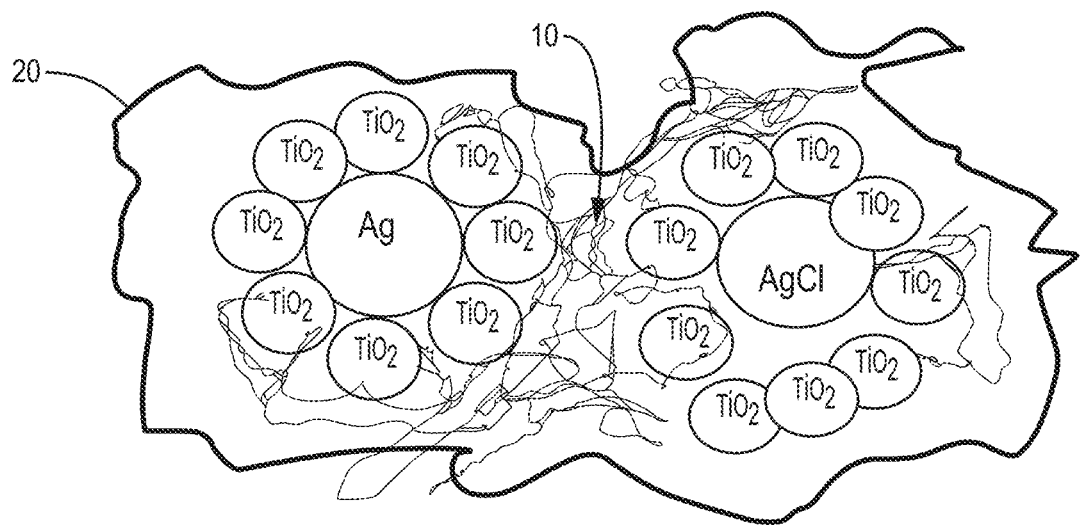
FIGS. 1A and 1B are schematics of the photocatalytic composite material where FIG. 1A contains $(TiO_2)_n$/Ag nanocomposites and $(TiO_2)_n$/AgCl nanocomposites associated with a polymer and a polyelectrolyte, namely, chitosan.

The present teachings describe a photocatalytic composite material that can remediate water by the action of its various components. The photocatalytic composite material is formulated to be dispersed on and in water, which photocatalytic composite material under natural light (e.g., visible light and/or sunlight) effectively and efficiently can activate the creation of ionized species and radicals that decompose harmful materials and contaminant compounds in the water, which action can decrease chemical oxygen demand ("COD") and allow aerobic bacteria to access the additionally available oxygen.

With more available oxygen, aerobic bacteria can compete more efficiently with BGA to consume available phosphorous, naturally remediating BGA blooms and expanding the diversity of algae, enhancing oxygen availability and further diversifying the food chain away from a dominant consumer (i.e., BGA). Decreased BGA naturally reduces nitrogen oxides (NOx) intake into the body of water, thereby remediating not only phosphorus but nitrogen too.

The photocatalytic components of the materials of the present teachings include $TiO_2$ associated with silver (Ag) nanoparticles such that numerous $TiO_2$ particles associate themselves with the Ag particles (($TiO_2)_n$/Ag). The photocatalytic components can also include silver chloride particles (($TiO_2)_n$/AgCl), which act as a counter electrode to the $(TiO_2)_n$/Ag particles.

In certain embodiments, the photocatalytic components also include Se, which can assist in electron transfer process as an electron acceptor to the electron donor, which is Ag. In some embodiments, the photocatalytic composite material also includes Cu.

The photocatalytic composite materials of the present teachings also can include a naturally sourced polymer engineered to possess positively charged moieties (i.e., a polycation) to bond with and agglomerate algae blooms and organic molecules to clear water columns for enhanced light penetration deeper into the water. That is, the cationically charged polyelectrolyte interacts with the negatively charged algae and related organic matter causing agglomeration and compaction of such structure clearing larger paths for light penetration and access to the photocatalytic components in the photocatalytic composite material in the water. Over time, such agglomerations and compactions possibly can settle from the water completely, to where at the bottom of the water further remediation activity can occur with the materials of the present teaching.

Further, the polyelectrolyte such as chitosan can be less dense than that water so it will float and keep the photocatalytic composite material suspended in the water near its surface and remain dispersed therein for long periods of time, for example, up to three days, a week, or more. This characteristic of the polyelectrolyte permits the photocatalytic components of the photocatalytic composite material to be exposed to the visible light and particularly, the sunlight, to produce the ionic species and radicals necessary for the decomposition of the unwanted matter and contaminant compounds in the water and creation of an oxygen rich, PH neutral environment. That is, the polyelectrolyte can permit the photocatalytic composite material to float on or near the surface of the water to maximize exposure to visible light and/or sunlight thereby initiating the remedial photocatalytic activity.

Definitions

To facilitate an understanding of the present invention, a number of terms and phrases are defined below.

Unless defined otherwise, all technical and scientific terms used herein have the same meaning as commonly understood by one of ordinary skill in the art to which this invention belongs. The abbreviations used herein have their conventional meaning within the chemical and biological arts. The chemical structures and formulae set forth herein are constructed according to the standard rules of chemical valency known in the chemical arts.

The terms "a" and "an" as used herein mean "one or more" and include the plural unless the context is inappropriate.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound, that compound can be used in various embodiments of compositions of the present invention and/ or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present invention also includes the specific quantitative value itself, unless specifically stated otherwise. As used herein, the term "about" refers to a ±10% variation from the nominal value unless otherwise indicated or inferred from the context.

At various places in the present specification, values are disclosed in groups or in ranges. It is specifically intended that the description include each and every individual subcombination of the members of such groups and ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

Throughout the description, where compositions and kits are described as having, including, or comprising specific components, or where processes and methods are described as having, including, or comprising specific steps, it is contemplated that, additionally, there are compositions and kits of the present invention that consist essentially of, or consist of, the recited components, and that there are processes and methods according to the present invention that consist essentially of, or consist of, the recited processing steps.

As a general matter, compositions specifying a percentage are by weight unless otherwise specified.

Photocatalysis is an emerging technology for the removal of recalcitrant contaminant compounds from water in need of remediation. Technically, the cascade of reactions involved in photocatalysis is initiated by the absorption of a photon, which excites an electron from the valence band to the conduction band of the semiconductor material thereby generating an electron-hole pair. The electron-hole pair can migrate to the material surface, where it reacts with surrounding water and dissolved oxygen to form reactive oxygen species ("ROS"). It is these ROS that participate in the oxidation of recalcitrant contaminant compounds in solution, leading to the breakdown of target contaminants into benign by-products.

A photocatalyst with a narrower band gap is in favor of capturing more visible-light photons. Accordingly, lowering the band gap of a photocatalytic material facilitates more photocatalytic activity with visible light.

The present teachings can support the rapid remediation of eutrophied water-bodies by increasing the availability of dissolved and undissolved oxygen, introducing a cohesive polyelectrolyte that precipitates colloidal and attached algae, decreasing turbidity and increasing the depth and rate of photosynthesis, unleashing a virtuous chain of activity-decreasing COD, which triggers ROS, accelerating the decomposition of heavy hydrocarbons and oils which in turn make oxygen attainable for aerobic bacteria, stimulating dormant microorganisms and/or driving efficiency of the natural biological purification process-all with minimal intervention and no external manmade energy source. This activity also fosters a virtuous reaction that has second order effects of dislodging and dissolving dense sedimentary organic sludge and releasing it as a digestible food source for the fast-improving aquatic environment. The photocatalytic composite material additionally remediates and reduces ammonia and hydrogen sulfide components contaminating the water, causing great harm to aquaculture farming.

Photocatalytic Composite Materials

The effects described herein can be realized by introducing a photocatalytic composite material including $TiO_2$ coated silver (($TiO_2)_n$/Ag) nanocomposites in the water. The (($TiO_2)_n$/Ag) nanocomposites are coated with a polyelectrolyte (e.g., chitosan), so that the photocatalytic composite material floats or remains suspended near the surface of the water. Such a photocatalytic composite material can hydrolyze the water to nano scale, producing a conveyor belt of oxygen nano-bubbles, which can remain in the water for days, even in saturated water, dissolving gradually and carrying particles, newly accessible as food stock for heretofore repressed native fauna, fish and micro-organisms.

In various embodiments, the photocatalytic composite material for water remediation contains $TiO_2$ together with Ag and selenium. In particular, the photocatalytic composite material according to the present teachings can include a $TiO_2$/Ag nanocomposite having a doping structure with Se that provides a visible light-reactive $TiO_2$ nanoparticles. It has a wide photocatalytic range from UV to visible light, for example, sunlight, and can promote decomposition of underwater pollutants and contaminant compounds, and oxidation of heavy metals.

In various embodiments, the photocatalytic composite material includes two types of nanocomposites (or "nano electrodes"), for example, Ag and AgCl, to form $TiO_2$ coated silver nanocomposites ("($TiO_2)_n$/Ag") and $TiO_2$ coated silver chloride ("($TiO_2)_n$/AgCl") nanocomposites. The photocatalytic composite material is coated with a polyelectrolyte (e.g., chitosan), and another polymer. The other polymer can be PVP and or polyethylene glycol (PEG). Without wishing to be bound by any particular theory, it is believed that the other polymer prevents agglomeration or aggregation of the $TiO_2$-containing nanocomposites so that their surface area is maximized to the radiating visible light and/or sunlight, i.e., maintaining an increased surface area of the $TiO_2$-containing nanocomposites to maximize photocatalytic activity.

With the inclusion of selenium as a doping agent, the photocatalytic composite material has a wide photocatalytic activation range, UV to visible light, while possessing a high potential for electron transmission with electron acceptors that promote decomposition of underwater pollutants and oxidation of heavy metals. In addition, the combination of ($TiO_2)_n$/Ag nanocomposites and the ($TiO_2)_n$/AgCl nanocomposites can provided excellent electrical properties of interfacial charge transference and surface reaction so that the resulting material produced through photocatalytic redox can effectively remove organic nitrogen, phosphorus, and other poorly decomposing pollutants and contaminant compounds. In addition, the presence of silver affords the photocatalytic composite material antimicrobial properties.

More specifically, in certain embodiments, a photocatalytic composite material of the present teachings for water remediation generally includes $TiO_2$, Ag, AgCl, Se and a polyelectrolyte binder (e.g., a mixture of chitosan and polyvinylpyrrolidone (PVP)). See FIGS. 1A and 1B for schematics of the general chemical structure of a photocatalytic composite material of the present teachings. FIG. 1A depicts ($TiO_2)_n$/Ag and ($TiO_2)_n$/AgCl nanocomposites colloids that are associated with a polymer 10 and chitosan 20.

Figure 1B:
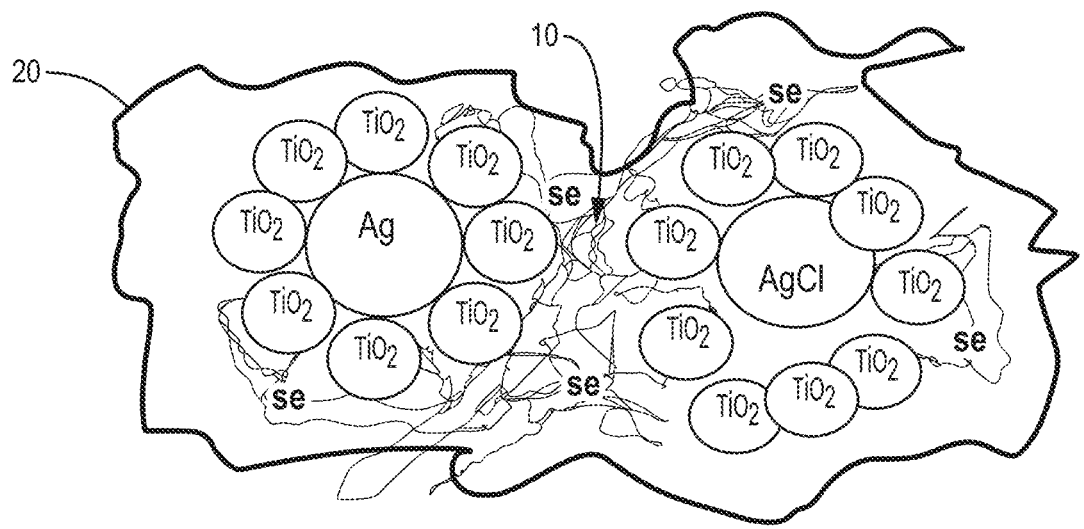

FIG. 1B is similar to FIG. 1A but includes Se associated with the $TiO_2$-containing nanocomposites as a doping agent to facilitate an efficient electron transfer mechanism. With these components, $TiO_2$—Ag nanocomposites can be formed along with $TiO_2$—Ag—Se and $TiO_2$—AgCl and $TiO_2$—AgCl—Se nanocomposites, creating a doping structure in preparing a visible light-reactive $TiO_2$ photocatalyst composition.

Depending on the application, the photocatalytic composite material can further contain precious or noble metals such as Au and Pt or transition metal components such as Ni and Co in addition to Ag and AgCl. It is believed that, like the $TiO_2$—Ag nanocomposite containing Se, the additional metal component(s) can be in the form of a nanocomposite with a doping structure.

The $TiO_2$ generally is substantially anatase phase $TiO_2$ (e.g., at least about 80%, at least about 85%, at least about 90%, or at least about 95%, or at least about 99% is this phase). The $TiO_2$ particles can have a mean diameter between about 0.5 nm and about 20 nm.

In some embodiments, the photocatalytic composite material has a concentration of the $TiO_2$ from about 25 mg/L to about 1000 mg/L, from about 35 mg/L to about 500 mg/L, or from about 50 mg/L to about 200 mg/L. In various embodiments, the photocatalytic composite material has a concentration of the $TiO_2$ from about 100 mg/L to about 500 mg/L, or from about 65 mg/L to about 250 mg/L, or from about 75 mg/L to about 150 mg/L. In some embodiments, the photocatalytic composite material has a concentration of the $TiO_2$ from about 100 mg/L to about 200 mg/L. In particular embodiments, the photocatalytic composite material has a concentration of the $TiO_2$ from about 50 mg/L to about 200 mg/L or to about 250 mg/L or to about 325 mg/L.

In certain embodiments, the concentration of the Ag in the photocatalytic composite material is about 5 mg/L to about 35 mg/L, or about 10 mg/L to about 25 mg/L, or about 10 mg/L to about 20 mg/L. In particular embodiments, the concentration of Ag in the photocatalytic composite material is about 5 mg/L to about 15 mg/L or to about 25 mg/L.

In various embodiments, the concentration of the AgCl in the photocatalytic composite material is about 5 mg/L to about 35 mg/L, or about 10 mg/L to about 25 mg/L, or about 10 mg/L to about 20 mg/L.

In some embodiments, the concentration of the Se in the photocatalytic composite material is about 0.1 mg/L to about 3 mg/L, or about 0.2 mg/L to about 1.5 mg/L, or about 0.3 mg/L to about 1 mg/L.

With respect to the photocatalytic components of the photocatalytic composite material, in some embodiments, about 70% to about 90% by weight of the photocatalytic components can be $TiO_2$ with about 10% to about 30% being Ag/Se or Ag/AgCl/Se. In certain embodiments, about 80% of the photocatalytic components can be $TiO_2$ with the remaining 20% being Ag/Se or Ag/AgCl/Se The Ag in the photocatalytic composite material typically includes less than about 10% of $Ag^+$. In various embodiments, the Ag in the photocatalytic composite material includes less than about 20% or less than about 15% of $Ag^+$. In some embodiments, the Ag in the photocatalytic composite material includes less than about 5% $Ag^+$. Ag particles can have a mean diameter of between about 15 nm and about 75 nm.

In various embodiments, the photocatalytic composite material includes a polyelectrolyte that is a cationic polyelectrolyte. The cationic polyelectrolyte can be a cationic biopolymer, for example, chitosan. In some embodiments, the ($TiO_2)_n$/Ag particles are coated by or encapsulated by the polyelectrolyte and another polymer, when present.

For example, the coating can be chitosan and another polymer such as PVP and/or PEG. Chitosan is a polyelectrolyte used as a polymer agglomerating agent for aggregating underwater floats. It does not dissolve in water and is prepared in a solvent by diluting an organic or inorganic acid during manufacture. Chitosan or any other cationic polyelectrolyte of the present teachings aggregates by electrical neutralization bonding with an algae and colloidal substances in water, which are negatively charged materials. The composition reduces turbidity by agglomerating and precipitating algae and other colloidal substances, Further, the chitosan can maintain the agglomerated contaminants close to the photocatalytic species that can quickly decompose them into environmentally friendly substances reducing the toxicity of the water or sludge. Moreover, coating the photocatalyst nanocomposites with a floating polyelectrolyte such as chitosan helps keep the nanocomposites floating while also attaching to harmful algae to prevent its growth.

In various embodiments, the photocatalytic composite material has a concentration of the polyelectrolyte from about 0.3 g/L to about 25 g/L, or about 1 g/L to about 20 g/L or to about 15 g/L, or about 5 g/L to about 10 g/L.

In particular embodiments, the concentration of the other polymer in the photocatalytic composite material is about 0.001 g/L to about 25 g/L. In various embodiments, the concentration of the other polymer is about 0.005 g/L to about 20 g/L. In certain embodiments, the concentration of the other polymer is about 0.01 g/L to about 10 g/L. In particular embodiments, the concentration of the other polymer is about 0.01 g/L to about 5 g/L.

In various embodiments, the photocatalytic composite material includes about 0.0005% to about 5% by weight of the polyelectrolyte based on the total weight of the photocatalytic composite material. In some embodiments, the photocatalytic composite material can include about 0.01% to about 3% by weight of the polyelectrolyte based on the total weight of the photocatalytic composite material. In certain embodiments, the photocatalytic composite material includes about 0.5% to about 2% by weight of the polyelectrolyte based on the total weight of the photocatalytic composite material. In some embodiments, the photocatalytic composite material includes about 0.0005% to about 1% by weight of the polyelectrolyte based on the total weight of the photocatalytic composite material In particular embodiments, the polyelectrolyte is chitosan $(C_6H_{11}NO_4)_m)$. (Here, m is meant for symbolism of a polymeric structure.)

More specifically, chitosan is a biopolymer extracted from chitin (the main structural component of crustacean shells) and can be used as a polyelectrolyte and agglomerating agent for aggregating underwater algae blooms and floats. Chitosan material is a polycationic polymer replaced with an amino group through a chemical deacetylation reaction in chitin.

An acid such as aqueous acetic acid can be used as a solvent for polyelectrolyte chitosan and also acts as a dispersant in the body of water, to provide a localized pH suitable for the formation and efficient growth of naturally occurring microorganisms.

In various embodiments, the solvent includes water, ethylene glycol, methylene glycol, diethylene glycol, an acid, and combinations thereof. In some embodiments, the acid is acetic acid.

In certain embodiments, the photocatalytic composite material includes about 0.001% to about 3% by weight of the acid based on the total weight of the photocatalytic composite material. In some embodiments, photocatalytic composite material includes about 0.01% to about 2% by weight of the acid based on the total weight of the photocatalytic composite material. In particular embodiments, the photocatalytic composite material includes about 0.001% to about 1% by weight of the acid based on the total weight of the photocatalytic composite material. In some embodiments, the acid includes or is acetic acid.

In particular embodiments, the photocatalytic composite material has the weight ratio of the polyelectrolyte to the acid in a range of about 10:1 to about 5:4 or in a range of about 1:1 to about 4:1.

The pH of the photocatalytic composite material typically is in the range of about 3 to about 6. In some embodiments the pH of the photocatalytic composite material is in the range of about 4 to about 5.

The total amount of the solvent (e.g., including a "first solvent" and a "second solvent") in the photocatalytic composite material for water remediation can be between about 50% to about 99.9% by weight based on the total weight of the photocatalytic composite material. In various embodiments, the photocatalytic composite material includes about 70 to about 99.9% by weight of the solvent based on the total weight of the photocatalytic composite material. In some embodiments, the photocatalytic composite material includes about 80 to about 99.9% by weight of the solvent based on the total weight of the photocatalytic composite material.

In some embodiments, the weight ratio of polyelectrolyte to nanocomposite (i.e., metals and metal oxides) is from about 90-130:1, or about 100-120:1, or about 110:1. In certain embodiments, the weight ratio of polyelectrolyte to the other polymer (e.g., chitosan to PVP) is about 7-9:1, or about 8:1.

In particular embodiments, a photocatalytic composite material of the present teachings can include between about 0.05 mg/L to about 5 mg/L of copper (Cu), for example, about 2 or about 3 mg/L of Cu. Although Cu usually is avoided for water remediation, its presence can improve the antifungal and disinfectant properties of the photocatalytic composite material, if needed.

In various embodiments, if $TiO_2$/Cu particles are present, and the concentration of Cu in the photocatalytic composite material can be between about 0.5 mg/L to about 5 mg/L. In some embodiments, the amount of Cu in the photocatalytic composite material can be from about 0.5 mg/L to about 7 mg/L, or from about 0.5 mg/L to about 3 mg/L.

In various embodiments, a photocatalytic composite material of the present teachings can include silver, titanium dioxide, chitosan, and a polymer, and optionally selenium, copper, silver chloride, and an acid. For example, in some embodiments, the photocatalytic composite material can include about 5 mg/L to about 35 mg/L Ag; about 25 mg/L to about 1000 mg/L $TiO_2$; about 0.3 g/L to about 20 g/L chitosan; and about 0.0001 g/L to about 25 g/L polymer (e.g., PVP and/or PEG); and optionally about 0.1 mg/L to about 3 mg/L Se; about 0.05 mg/L to about 5 mg/L Cu; about 5 mg/L to about 35 mg/L AgCl; and about 0.001% to about 3% by weight acid (e.g., acetic acid), based on the total weight of the photocatalytic composite material.

In certain embodiments, the photocatalytic composite material can include about 5 mg/L to about 15 mg/L or to about 20 mg/L or to about 25 mg/L Ag; about 50 mg/L to about 200 gm/L or to about 250 mg/L $TiO_2$; about 5 g/L to about 15 g/L chitosan; and about 0.01 g/L to about 5 g/L polymer (e.g., PVP and/or PEG); and optionally about 0.3 mg to about 1 mg/L Se; about 0.5 mg/L to about 3 mg/L Cu; about 10 mg/L to about 20 mg/L AgCl; and about 0.001% to about 1% by weight acid (e.g., acetic acid), based on the total weight of the photocatalytic composite material. Of course, the amounts of these components can be varied in the photocatalytic composite material as described herein.

In some embodiments, the photocatalytic composite material can include Ag (e.g., from about 6 mg/L to about 40 mg/L); $TiO_2$ (e.g., from about 100 mg/L to about 360 mg/L); chitosan (e.g., from about 0.1 g/L to about 25 g/L); and PVP (e.g., from about 300 mg/L to about 2500 mg/L). The photocatalytic composite material can include acetic acid (e.g., from about 0.01% to about 0.2%).

In certain embodiments, the photocatalytic composite material can include Ag (e.g., from about 6 mg/L to about 40 mg/L such as about 10 mg/L to about 30 mg/L), $TiO_2$ (e.g., from about 100 mg/L to about 360 mg/L such as about 100 mg/L to about 200 mg/L, or about 200 mg/L to about 300 mg/L), Se (e.g., from about 0.01 mg/L to about 5 mg/L such as about 1 mg/L or about 32 mg/mL), and chitosan (e.g., from about 0.1 g/L to about 25 g/L such as about 1 g/L to about 10 g/L or about 1 g/L to about 15 g/L). In particular embodiments, the photocatalytic composite material can include PVP (e.g., from about 0.01 g/L to about 2.5 g/L such as about 0.1 g/L to about 10 g/L or about 0.1 g/L to about 5 g/L).

In some embodiments, the photocatalytic composite material can include Ag (e.g., from about 10 mg/L to about 30 mg/L), $TiO_2$ (e.g., from about 150 mg/L to about 250 mg/L), Se (e.g., from about 0.01 mg/L to about 2 mg/L), chitosan (e.g., from about 5 g/L to about 15 g/L; and PVP (e.g., from about 1 g/L to about 2.5 g/L).

In various embodiments, the photocatalytic composite material can include Ag (e.g., from about 6 mg/L to about 40 mg/L), $TiO_2$ (e.g., from about 100 mg/L to about 360 mg/L), Se (e.g., from about 0.01 mg/L to about 5 mg/L), Cu (e.g., from about 0.1 mg/L to about 5 mg/L such as about 2 mg/L or about 3 mg/L), and chitosan (e.g., from about 0.1 g/L to about 25 g/L). In particular embodiments, the photocatalytic composite material can include PVP (e.g., from about 300 mg/L to about 2500 mg/L).

In some embodiments, the photocatalytic composite material can include Ag (e.g., from about 10 mg/L to about 30 mg/L), $TiO_2$ (e.g., from about 150 mg/L to about 250 mg/L), Se (e.g., from about 0.01 mg/L to about 2 mg/L), Cu (e.g., from about 0.1 mg/L to about 3 mg/L), chitosan (e.g., from about 5 g/L to about 15 g/L; and PVP (e.g., from about 1000 mg/L to about 2500 mg/L).

In particular embodiments, the photocatalytic composite material can include Ag (e.g., about 10 mg/L or about 30 mg/L), $TiO_2$ (e.g., about 165 mg/L or about 200 mg/L), Se (e.g., about 1 mg/L or about 2 mg/L), Cu (e.g., about 2 mg/L or about 3 mg/L), chitosan (e.g., about 9 g/L or about 13 g/L; and PVP (e.g., about 1000 mg/L or about 1500 mg/L).

In some embodiments, the photocatalytic composite material can include PEG (e.g., from about 300 mg/L to about 2500 mg/L or to about 1500 mg/L or to about 750 mg/L). In certain embodiments, the photocatalytic composite material can include PEG (e.g., about 250 mg/L to about 500 mg/L such as 250 mg/L or 350 mg/L or 500 mg/L).

In some embodiments, the photocatalytic composite material can include $TiO_2$ (e.g., from about 100 mg/L to about 200 mg/L), Ag (from about 5 mg/L to about 15 mg/L), Se (e.g., from about 0.1 mg/L to about 1.5 mg/L), Cu (e.g., from about 0.1 mg/L to about 2.5 mg/L), PVP (from about 300 mg/L to about 750 mg/L or to about 500 mg/L or to about 400 mg/L), PEG (from about 100 mg/L to about 750 mg/L or to about 500 mg/L or to about 400 mg/L or to about 300 mg/L or to about 200 mg/L), and chitosan (e.g., from about 1 g/L to about 25 g/L or to about 20 g/L or to about 15 g/L or to about 10 g/L or to about 5 g/L). In particular embodiments, the photocatalytic composite material can also include a small amount of hydrochloric acid, for example, for the initial dissolution of the $TiO_2$ particles.

In various embodiments, the present teachings provide a photocatalytic composite material including silver, titanium dioxide, chitosan, and a (another) polymer, and optionally selenium, copper, silver chloride, and an acid. In various embodiments, the present teachings provide a photocatalytic composite material including silver, titanium dioxide, selenium, chitosan, and a (another) polymer, and optionally copper, silver chloride, and an acid. In some embodiments, the present teachings provide a photocatalytic composite material including silver, titanium dioxide, selenium, copper, chitosan, and a (another) polymer, and optionally silver chloride and an acid. In certain embodiments, the present teachings provide a photocatalytic composite material including silver, titanium dioxide, selenium, copper, chitosan, an acid and a polymer, and optionally silver chloride. In particular embodiments, the present teachings provide a photocatalytic composite material including silver, titanium dioxide, selenium, copper, chitosan, an acid, a (another) polymer, and silver chloride. In these embodiments, the above amounts described herein of the various components apply equally here as well as elsewhere in the application.

Methods of Making the Photocatalytic Composite Materials

In another aspect, the present teachings provide a method of making a photocatalytic composite material. The methods can generally comprise mixing $TiO_2$, Ag (such as $AgNO_3$) and another polymer in a first solvent to form a first mixture; exposing the first mixture to a reducing agent until less than about 20% of the Ag is $Ag^+$ to form a reduced mixture; mixing a cationic polyelectrolyte, optionally an acid, and the other polymer in a second solvent to form a second mixture; and adding the second mixture to the reduced mixture thereby forming a photocatalytic composite material.

The composition for a photocatalytic composite material of the present teachings can comprise an initial solution containing $TiO_2$, Ag, another polymer and a first solvent; and a second solution containing a polyelectrolyte such as chitosan, the other polymer, optionally an acid such as acetic acid, and a second solvent. Other components as described herein can be present in the appropriate solvent prior to forming a photocatalytic composite material of the present teachings.

The first mixture is exposed to ultraviolet (UV) radiation such as UVC radiation (e.g., about 200 nm) until the amount of Ag present is less than about 15% $Ag^+$, or less than about 10% $Ag^+$, or less than about 5% $Ag^+$. The amount of $Ag^+$ present can be determined by using UV spectrometry, for example, at a wavelength of about 415 nm to about 430 nm.

For example, in making a photocatalytic composite material, the photocatalyst nanocomposites are mixed in a first solvent including another polymer; and the polyelectrolyte, an acid, and the other polymer dissolved in a second solvent, which are mixed together after the first mixture is exposed to a reducing agent to prepare the photocatalytic composite material. The first solvent and the second solvent can contain one or more of water, polyvinylpyrrolidone (PVP), monoethylene glycol (MEG), diethylene glycol (DEG), acetic acid, and combinations thereof. The first solvent and the second solvent may be the same or different, and may be mixed with distilled water for hydrolysis and/or acid gas reaction.

The total amount of the first solvent and the second solvent (also referred to herein as the "solvent" of the photocatalytic composite material) in the photocatalytic composite material for water remediation can be between about 50% to about 99.9% by weight based on the total weight of the photocatalytic composite material. In various embodiments, the photocatalytic composite material includes about 70 to about 99.9% by weight of the first solvent and the second solvent based on the total weight of the photocatalytic composite material. In some embodiments, the photocatalytic composite material includes about 80 to about 99.9% by weight of the first solvent and the second solvent based on the total weight of the photocatalytic composite material.

In various embodiments, the reducing agent comprises ultraviolet radiation (e.g., UVC radiation such as 200 nm), microwaves, or a combination thereof. In certain embodiments the mixture is exposed to a reducing agent until less than about 15% or less than about 10% by weight of the Ag is $Ag^+$.

In some embodiments, the mixing further comprises mixing Se (such as $Na_2SeO_4$) and/or Cu (such as $Cu(NO_3)_2 \cdot 3H_2O$) and/or AgCl in the first solvent.

Methods of Using the Photocatalytic Composite Materials

In another aspect, the present teachings provide a method of water remediation comprising contacting a photocatalytic composite material as described herein with a body of water in need of remediation; and exposing the photocatalytic composite material to visible light and/or sunlight for a suitable time and under conditions suitable for the photocatalytic composite material to cause contaminant compounds in the body of water to be transformed into one or more different compounds. In various embodiments, the body of water is an open body of water. In some embodiments, the body of water is a wetland or a rice field. In certain embodiments, the body of water is an aquaculture farm.

The photocatalytic composite material in liquid form is dispersed across the body of water in an amount dependent on the starting condition of the water, the remediation target, and various other factors. Typically, depending on the specific formulation, a high dose of the photocatalytic composite mater of about 5 ppb $TiO_2$ (amount in body of water being treated) is dispersed across the body of water to be treated, which amount can be poured or sprayed across the area. To homogenize the photocatalytic composite material in the water, turbulence can be created in the water, for example, with the use of a blower or rotatory boat motor to disperse and mix the photocatalytic composite material to expedite the remediation process.

Generally, the target amount of $TiO_2$/Ag is less than about 6 ppb in the water to be remediated. The target amount of $TiO_2$ in the water to be remediated can be less than about 5 ppb and the target amount of Ag can be less than about 0.5 ppb. For water not requiring a high level of remediation, a lower dose of about 2.5 ppb $TiO_2$ is suggested. Further, again depending on the level of remediation needed, lower doses of about 75%, about 50%, about 35%, about 25%, about 20%, about 15%, or about 10% of those amounts can be used.

If Se is present in the photocatalytic composite material, it usually is present in the photocatalytic composite material at about 1.1 ppm or less, for example, about 1.1 ppm, about 1 ppm, about 0.9 ppm, about 0.8 ppm, about 0.7 ppm, about 0.6 ppm, about 0.5 ppm, about 0.4 ppm, about 0.3 ppm, about 0.2 ppm, or about 0.1 ppm. With respect to amount present in the water to be treated, Se is present at about 1.1 ppb or less, for example, at about 1.1 ppb, about 1 ppm, about 0.9 ppb, about 0.8 ppb, about 0.7 ppb, about 0.6 ppb, about 0.5 ppb, about 0.4 ppb, about 0.3 ppb, about 0.2 ppb, or about 0.1 ppb.

The present teachings can describe the amount of "effective material" in a formulation, which is the total concentration of active metal species present in the formulation. For example, in Example 4 below, the effective material is a total of 162.5 mg/L $TiO_2$+10.31 mg/L Ag+1.84 mg/L Cu+0.94 mg/L Se, which total is 175.5 mg/L. The amount of effective material in a formulation typically is between about 100 mg/L and about 450 mg/L, or between about 100 mg/L to about 350 mg/L, or about 100 mg/L to about 275 mg/L, or about 100 mg/L to about 225 mg/L. The effective amount of the formulation is considered to be 1 ppm, i.e., 1 ppm is the amount of product with a concentration of 175.5 mg/L of effective material (175.5 mg/1000 L). In this example, 1 ppm of product in the lake water would be considered to be about 0.1755 ppb of effective material in the lake water (assuming using 1 ppm of product for every 1000 L of lake water). For 2 ppm, the effective material in the lake water would be about 0.356 bbp. In general, the amount of product applied to a body of water is between about 0.5 ppm to about 2 ppm of product so that the effective material will be between about 0.05 ppb to about 0.5 ppb, or 0.9 ppb to about 0.4 ppb, or 0.12 ppb to about 0.35 ppb in the lake water.

The amounts of the components that contribute to the effective material can be within their ranges as described herein. For example, $TiO_2$ is the predominant species or component contributing to the effective material, e.g., greater than 75%, 80%, 85%, 90%, or 95% of the total effective material. Silver, copper and selenium can also be included in the effective material where their amounts are greatly reduced. For example, silver can be present in an amount of about 5% to about 10% of the amount of $TiO_2$; copper can be present in an amount of about 0.5% to about 2.5% of the amount of $TiO_2$; and selenium present in an amount of about 0.01% to about 1% of the amount of $TiO_2$.

The photocatalytic composite material will spread into the water and float at or near the surface of the water. Upon radiation of sunlight or other visible light, the photocatalytic composite material will begin to produce free hydroxyl ions and radicals next to the pollution and contaminant compounds in the water to oxidize the undesired species leading to their decomposition and/or removal. Without wishing to be bound to any particular theory, it is believed that the action of the photocatalytic composite material also produces oxygen and hydroxyl ions as microbubbles inside the water, which microbubbles contact gases and microorganisms to degas and kill the microorganisms. Moreover, the silver present in the photocatalytic composite material also acts as an antimicrobial assisting in the cleaning process. In addition, the created oxygen in the body of water permits aerobic bacteria to proliferate.

The treatment with the photocatalytic composite material can be daily, every other day, every third day, every fourth day, every fifth day, every sixth day, once a week, or at less frequent times. Because the floating duration of the photocatalytic composite material tends to be between about 3 days to about 7 days, bi-weekly or weekly treatment is a common practice.

The results of the water remediation can be measured by a variety of parameters. For example, the amounts of the following parameters can be measured before and after treatment (including mid-treatment to monitor progress): BGA in the water, chlorophyll a (phytoplankton biomass) in the water, water clarity, total suspended solids ("TSS") in the water, BOD in the water, pH of the water, total nitrogen in the water, total phosphorus in the water, total nitrogen in the sedimentation, total phosphorus in the sedimentation, total organic matter in the sedimentation, and total organic carbon in the sedimentation. These parameters are measured using industry standard analytical techniques, which can include portable equipment for measurements in the field. For example, a decrease in BGA in the body of water of at least 60% or at least 70% can be realized in about six weeks, with one treatment per week.

Further, particularly for wetlands and rice fields, the present teachings provide a method of reducing methane emissions during water remediation comprising contacting a body of water with the photocatalytic composite material as described herein, and exposing the photocatalytic composite material to visible light and/or sunlight for a suitable time and under conditions suitable for the photocatalytic composite material that can cause methane to be transformed into one or more of hydrogen, water and carbon dioxide.

EXAMPLES

Example 1. Production of Photocatalytic Composite Material

A photocatalytic composite material was prepared by mixing at room temperature 1.5 L PVP dissolved in water (1.8 g/L in water), 100 mL $AgNO_3$ dissolved in water (62.8 g/L in water) and 200 mL $TiO_2$ (200 g/L acidic water base anatase $TiO_2$) in 98.2 L of distilled water to form a first mixture. The first mixture was exposed to UVC radiation at about 200 nm for about 3 hours to provide a reduced mixture.

Separately, 2500 g chitosan was mixed with 1 L of acetic acid and 0.2 L PVP (1.8 g/L) in 98.8 L distilled water to form a second mixture. The second mixture was added to the reduced mixture with stirring at ambient temperature to form the photocatalytic composite material.

During this process, it is believed that the chitosan and PVP associates with or encapsulates the $TiO_2$/Ag nanocomposites to form the final photocatalytic composite material in solution.

Example 2. Water Remediation Test #1

A water remediation test was conducted by NY Center for Clean Water Technology of Stony Brook University, to assess the remediation of BGA, nitrogen, and phosphorus in water and sedimentation from Lake Agawam, designated as the second dirtiest lake in New York State at the time of testing. The duration of the test was four weeks.

Twelve 20 L transparent containers were used, four containers were subjected to a low dose of a photocatalytic composite material; four containers were subjected to a high dose of a photocatalytic composite material, and four containers were designated as controls. To each container was added 1000 g mixed sludge from the bottom of the lake, then 10 L lake water, a fish ball aerator, and three each of two types of minnows (6 fish in each container).

The photocatalytic composite material of Example 1 was used in this experiment. The photocatalytic composite material was dispersed in each container so that the concentration of $TiO_2$ in each container was 5 ppb $TiO_2$ for the high dose and 2.5 ppb $TiO_2$ for the low dose (and the control did not receive any photocatalytic composite material). The same amounts were added to each container weekly. The containers were exposed to natural light at ambient temperature of the outdoor air.

The hypothesis to be tested was whether the photocatalytic composite material is an effective tool for reducing the amount of BGA and regulation of natural carbon and nitrogen cycles. The hypothesis was tested by the observations of measurements of BGA content in the water, nitrogen content in the water, phosphorus content in the water and sedimentation, total phytoplankton (chlorophyll a) biomass, total suspended solids, biological oxygen demand, and pH.

The results were successful on all measurements including a statistically significant reduction in fish mortality.

More specifically, the reduction in BGA over the course of the 28-day (4 week) test period showed a reduction of about 60% of BGA for the low dose treatment and a reduction of about 72% of BGA for the high dose treatment compared to the control.

The total phytoplankton biomass (chlorophyll a) was reduced about 27% with the low dose treatment and over 37% with the high dose treatment compared to the control. This result helps illustrate how the photocatalytic composite material remediates extra nutrients in the water by supporting the natural remediation cycle, thereby accelerating the consumption of micro-algae.

The total nitrogen in the water was reduced about 17% with the low dose treatment and about 28% with the high dose treatment compared to the control.

Total phosphorus in the water was reduced about 28% with the low dose treatment and about 34% with the high dose treatment compared to the control. Phosphorus in the sedimentation was reduced about 32% with the low dose treatment and about 44% with the high dose treatment compared to control. These results demonstrate phosphorus remediation to reduce algae blooms and remove organic sedimentation without dredging. In other words, the photocatalytic composite material is not a masking agent the encapsulates phosphorus in the sedimentation but rather releases the excess phosphorus trapped in the sedimentation that accelerates remediation and reduces the total phosphorus.

Moreover, the photocatalytic composite material can return the body of water to a sustainable equilibrium as evidenced by the change in pH of the water. The pH of the control was about 6.5 after the 4 weeks while the water experiencing the low dose treatment had a pH of about 6.8 and that experiencing the high dose treatment was neutral having a pH of about 7.

The total suspended solids were reduced about 22% with the low dose treatment and about 33% with the high dose treatment compared to the control. Treatment with the photocatalytic composite material quickly improved the visibility of the water samples, restoring the depth or reach of photosynthesis as well as reducing harmful algae and sedimentation.

The biological oxygen demand (BOD) was reduced about 8% with the low dose treatment and about 42% with the high dose treatment compared to the control. A reduction in the BOD while processing nitrogen and phosphorus is a strong indication of sustainable lake remediation.

Example 3—Water Remediation Test #2

A mesocosm water remediation test was conducted by NY Center for Clean Water Technology of Stony Brook University, to assess the remediation of BGA, nitrogen, and phosphorus in water and sedimentation from Lake Agawam, designated as the second dirtiest lake in New York State at the time of testing. The duration of the test was seven weeks.

Eight 300 L containers were used, four containers were subjected to a high dose of a photocatalytic composite material; and four containers were designated as controls. To each container was added 7 kg mixed sludge from the bottom of the lake, then 300 L lake water, and 20 of each of two types of baby minnows (40 fish in each container) (with 10 minnows in a cage for access).

The photocatalytic composite material of Example 1 was used in this experiment. Each container except for the controls were treated weekly to provide 5 ppb $TiO_2$ of the product in the tested lake water. The containers were exposed to natural light at ambient temperature of the lake water as the containers were in contact with the lake water at their tops.

The results of the experiment are shown in Table 2, where the rate improvement of lake water remediation using the photocatalytic composite material of the present teachings over a number of parameters are quite significant.

The amount of effective material considered for this formulation's concentration is about 175.5 mg/L (i.e., 162.5 mg/L $TiO_2$+10.31 mg/L Ag+1.84 mg/L Cu+0.94 mg/L Se), which is considered 1 ppm or about 0.1755 ppb in the lake water. For 2 ppm, the effective material in the lake water is about 0.356 bbp.

A total of 15 ppm of the final material was added to the natural lake over 13 weeks, where the first three weeks had 2 ppm added per week, the next seven weeks had 1 ppm added per week, then the next three weeks had 0.7 ppm added per week. Where the lake is about four acres with a depth between one to 13 feet deep. Assuming an average depth of about seven feet, the total volume of the lake was estimated to be about 28 acres fee or 34,500 cubic meters. According, for the first three weeks, 60 L of the final product was added to the lake per week; for the next seven weeks, 30 L of final product was added to the lake per week; and for the next three weeks, 20 L of final product was added to the lake per week. (Here, the effective material present in the lake water at about 2 ppm was about 0.31 bbp of effective material. However, in the lake water where the volume of water is uncertain, it is difficult to accurately determine the concentration of effective material present.)

The following results happened in sediment nutrient removal and water remediation together. The data below in Table 3 shows the weekly development of the diversity of algae during the treatment of the natural lake.

TABLE 2

| Parameter | Unit | Initial | Control | Treated | Control change | Treated change | Rate improvement |
|---|---|---|---|---|---|---|---|
| Water: Blue Green Algae | µg/L | 138.93 | 77.09 | 46.78 | 44.51% | 66.33% | 49.01% |
| Water: Chlorophyl a | µg/L | 149.86 | 161.59 | 30.975 | −7.83% | 79.33% | 1113.47% |
| Water clarity (Sachi disk) | cm | 18 | 20 | 80 | 11.11% | 344.44% | 3000.00% |
| Water: Total Nitrogen | µM/L | 283.31 | 241.87 | 77.83 | 14.63% | 72.53% | 395.85% |
| Water: Total Phosphorus | µM/L | 8.662 | 7.457 | 1.395 | 13.91% | 83.90% | 503.07% |
| Sediment: Total Nitrogen | % | 1.03 | 0.857 | 0.797 | 16.80% | 22.62% | 34.68% |
| Sediment: Total Phosphorus | µM/g | 31.88 | 12.92 | 9.31 | 59.47% | 70.80% | 19.04% |
| Sediment: Total Organic Carbon | % | 9.17 | 8.51 | 7.72 | 7.20% | 15.81% | 119.70% |

Example 4—Water Remediation, Sediment Nutrient Removal and Sediment Reduction

One liter (L) of photocatalytic composite material was prepared by mixing polyvinylpyrrolidone (PVP) (380 mg) and polyethylene glycol (PEG) (380 mg) with about 987.5 mL water at ambient temperature to provide Mixture A.

Mixture B was prepared by mixing 2500 mg $TiO_2$ solution (10% dispersed in 25 mL HCl (37%) and water), $AgNO_3$ (25 mg dissolved in 4.975 mL of distilled water), cupric nitrate trihydrate ($Cu(NO_3)_2 \cdot 3H_2O$) (10.80 mg dissolved in 4.990 mL distilled water) and sodium selenate ($Na_2SeO_4$) (3.16 mg dissolved in 4.997 mL distilled water) for 24 hours. Mixture A was mixed with the Mixture B to provide 1 L of Mixture C. Mixture C was mixed and exposed to UV radiation until the conversion of $Ag+$ to Ag became about 90% (i.e., less than about 10% by weight of $Ag^+$ remains in Mixture C).

Separately, 25 g chitosan was mixed with 10 mL of acetic acid and 2 mL PVP (of 1.8 g PVP/L of water) in 988 mL distilled water to form Mixture D.

650 mL of Mixture C was added to 350 mL of Mixture D to form one L of final product, i.e., a photocatalytic composite material.

TABLE 3

| Date | week | Average BGA | Average Green Algae | Average Diatom | Average Cryptophytes | Average Total |
|---|---|---|---|---|---|---|
| 7/10 | 1 | 17.50 | 55.75 | 4.74 | 0.00 | 79.00 |
| 7/17 | 2 | 21.37 | 31.21 | 2.54 | 0.00 | 55.12 |
| 7/24 | 3 | 23.47 | 32.43 | 3.91 | 0.00 | 59.81 |
| 7/31 | 4 | 19.03 | 42.94 | 4.52 | 0.03 | 66.50 |
| 8/7 | 5 | 13.11 | 52.47 | 11.55 | 1.12 | 78.25 |
| 8/14 | 6 | 18.42 | 9.33 | 10.50 | 0.45 | 38.70 |
| 8/21 | 7 | 8.37 | 31.69 | 15.51 | 4.35 | 59.92 |
| 8/28 | 8 | 18.21 | 33.66 | 20.09 | 1.87 | 73.83 |
| 9/5 | 9 | 13.43 | 40.52 | 35.17 | 1.88 | 90.99 |
| 9/12 | 10 | 8.44 | 25.57 | 28.49 | 2.39 | 64.89 |
| 9/18 | 11 | 12.71 | 31.10 | 22.54 | 4.99 | 71.34 |
| 9/26 | 12 | 11.41 | 28.65 | 12.01 | 0.16 | 52.23 |
| 10/3 | 13 | 11.65 | 30.81 | 3.83 | 0.68 | 46.97 |
| 10/9 | 14 | 13.63 | 45.57 | 10.06 | 1.62 | 70.88 |

In 12 week, total algae and BGA is reduced while an increase occurs in the diversity of algae.

The average diversity of different algae is shown in Table 4.

TABLE 4

| Algae | | Average BGA | Average Green Algae | Average Diatom | Average Cryptophytes | Average Toral |
|---|---|---|---|---|---|---|
| diversity | At start | 17.09% | 76.91% | 6.00% | 0.00% | 100.00% |
| diversity | At week 11 | 17.82% | 43.59% | 31.60% | 6.99% | 100.00% |

In addition, the sediment decomposition and decreasing depth of the sediment showed a reduction of 50% in total nitrogen which is helping the environment to be more active in food chain. Measurement sampling was done in three specific points of the lake, where each point had three samples taken for measurement. The total phosphorous measurement was based on the EPA pre-sulfurated method. Table 5 shows the results of these measurements.

TABLE 5

| Week of | Point/Average | Total Nitrogen | Total Free P (calc from $P_2O_5$) | PreSulf Total Phosphorus | % TN change vs 7/17 |
|---|---|---|---|---|---|
| Jul. 17, 2023 | 1 | 3400 | 223 | 227 | |
| Jul. 17, 2023 | 3 | 2500 | 206 | 248 | |
| Jul. 17, 2023 | 5 | 3600 | 193 | 247 | |
| Jul. 17, 2023 | Average 07/17 | 3167 | 207 | 241 | |
| Aug. 7, 2023 | 1 | 2300 | 165 | 219 | −32.4% |
| Aug. 7, 2023 | 3 | 1700 | 186 | 254 | −32.0% |
| Aug. 7, 2023 | 5 | 2400 | 162 | 254 | −33.3% |
| Aug. 7, 2023 | Average 08/07 | 2133 | 171 | 242 | −32.6% |
| Aug. 28, 2023 | 1 | 617 | 183 | 239 | −81.9% |
| Aug. 28, 2023 | 3 | 920 | 219 | 288 | −63.2% |
| Aug. 28, 2023 | 5 | 1600 | 209 | 288 | −55.6% |
| Aug. 28, 2023 | Average 08/28 | 1046 | 203 | 272 | −67.0% |
| Sep. 18, 2023 | 1 | 1410 | 197 | 232 | −58.5% |
| Sep. 18, 2023 | 3 | 1620 | 221 | 246 | −35.2% |
| Sep. 18, 2023 | 5 | 1260 | 203 | 242 | −47.5% |
| Sep. 18, 2023 | Average 09/18 | 1430 | 207 | 240 | −54.8% |

INCORPORATION BY REFERENCE

This application refers to various issued patents, published patent applications, journal articles, and other publications, all of which are incorporated herein by reference. If there is a conflict between any of the incorporated references and the instant specification, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the disclosure can be excluded from any claim, for any reason, whether or not related to the existence of prior art.

EQUIVALENTS

The disclosure may be embodied in other specific forms without departing from the spirit or essential characteristics thereof. The foregoing embodiments are therefore to be considered in all respects illustrative rather than limiting the disclosure described herein. Scope of the disclosure is thus indicated by the appended claims rather than by the foregoing description, and all changes that come within the meaning and range of equivalency of the claims are intended to be embraced therein.

What is claimed is:

1. A photocatalytic composite material comprising:
   titanium dioxide ($TiO_2$) particles in a concentration of about 35 mg/L to about 500 mg/L;
   silver (Ag) particles in a concentration of about 5 mg/L to about 35 mg/L;
   chitosan in a concentration from about 5 g/L to about 10 g/L; and
   a solvent.

2. The photocatalytic composite material of claim 1, further comprising another polymer.

3. The photocatalytic composite material of claim 2, wherein the other polymer comprises polyvinylpyrrolidone (PVP).

4. The photocatalytic composite material of claim 1, wherein the solvent comprises water and an acid.

5. The photocatalytic composite material of claim 1, wherein the concentration of the $TiO_2$ particles is about 65 mg/L to about 250 mg/L.

6. The photocatalytic composite material of claim 1, wherein the concentration of the Ag particles is about 10 mg/L to about 25 mg/L.

7. The photocatalytic composite material of claim 3, wherein the concentration of PVP is about 0.01 g/L to about 5 g/L.

8. The photocatalytic composite material of claim 1, further comprising selenium (Se), wherein the concentration of the Se is about 0.05 mg/L to about 3 mg/L.

9. The photocatalytic composite material of claim 1, further comprising copper (Cu), wherein the concentration of the Cu is about 0.5 mg/L to about 7 mg/L.

10. A photocatalytic composite material comprising:
    titanium dioxide ($TiO_2$) particles in a concentration of about 100 mg/L to about 500 mg/L;
    silver (Ag) particles in a concentration of about 5 mg/L to about 35 mg/L;
    chitosan in a concentration from about 8 g/L to about 20 g/L; and
    a solvent.

11. The photocatalytic composite material of claim 10, wherein the concentration of the $TiO_2$ particles is about 150 mg/L to about 250 mg/L.

12. A photocatalytic composite material comprising:
    titanium dioxide ($TiO_2$) particles in a concentration of about 35 mg/L to about 500 mg/L;
    silver (Ag) particles in a concentration of about 5 mg/L to about 35 mg/L;
    selenium (Se) in a concentration of about 0.05 mg/L to about 3 mg/L;
    chitosan in a concentration from about 8 g/L to about 20 g/L; and
    a solvent.

13. The photocatalytic composite material of claim 12, further comprising copper (Cu).

14. The photocatalytic composite material of claim 13, further comprising another polymer.

15. A photocatalytic composite material comprising:
    titanium dioxide ($TiO_2$) particles in a concentration of about 35 mg/L to about 500 mg/L;
    silver (Ag) particles in a concentration of about 5 mg/L to about 35 mg/L;
    copper (Cu) in a concentration of about 0.5 mg/L to about 7 mg/L;

chitosan in a concentration from about 8 g/L to about 20 g/L; and a solvent.

16. The photocatalytic composite material of claim 15, further comprising selenium (Se).

17. The photocatalytic composite material of claim 16, wherein the concentration of the Se is about 0.05 mg/L to about 3 mg/L.

18. The photocatalytic composite material of claim 16, further comprising another polymer.

19. The photocatalytic composite material of claim 18, wherein the concentration of the other polymers is about 0.01 g/L to about 5 g/L.

20. The photocatalytic composite material of claim 19, wherein the other polymer comprises polyvinylpyrrolidone.

* * * * *